(12) United States Patent
McKean

(10) Patent No.: US 6,654,851 B1
(45) Date of Patent: Nov. 25, 2003

(54) SYSTEM, APPARATUS, AND METHOD FOR USING A DISK DRIVE FOR SEQUENTIAL DATA ACCESS

(75) Inventor: Brian D. McKean, Longmont, CO (US)

(73) Assignee: International Business Machine Corporation, Armonk, NY (US)

( * ) Notice: Subject to any disclaimer, the term of this patent is extended or adjusted under 35 U.S.C. 154(b) by 0 days.

(21) Appl. No.: 09/524,449

(22) Filed: Mar. 14, 2000

(51) Int. Cl.[7] .......................... G06F 12/00; G06F 9/455
(52) U.S. Cl. ............................. 711/112; 711/4; 703/23; 703/24
(58) Field of Search ..................... 711/111, 112, 161, 711/162, 4; 703/23, 24; 707/101; 341/51

(56) References Cited

U.S. PATENT DOCUMENTS

| | | | | | |
|---|---|---|---|---|---|
| 5,097,261 A | * | 3/1992 | Langdon, Jr. et al. | ........ | 341/51 |
| 5,237,553 A | * | 8/1993 | Fukushima | .............. | 369/53.17 |
| 5,438,674 A | * | 8/1995 | Keele | .......................... | 395/404 |
| 5,454,098 A | * | 9/1995 | Pisello et al. | .................. | 703/24 |
| 5,684,986 A | * | 11/1997 | Moertl et al. | ................ | 707/101 |
| 5,832,213 A | * | 11/1998 | Duncan | ........................ | 711/111 |
| 5,926,834 A | * | 7/1999 | Carlson | ........................ | 711/152 |
| 6,031,698 A | * | 2/2000 | Bar | .............................. | 360/134 |
| 6,128,698 A | * | 10/2000 | Georgis | ....................... | 711/111 |
| 6,173,359 B1 | * | 1/2001 | Carlson et al. | .............. | 711/111 |
| 6,298,414 B1 | * | 10/2001 | Yoshida et al. | .............. | 711/111 |

* cited by examiner

*Primary Examiner*—Kimberly McLean-Mayo
(74) *Attorney, Agent, or Firm*—Dorsey & Whitney LLP

(57) ABSTRACT

The invention includes a disk drive that includes a controller that is connected to a physical media. The controller includes a processor that is connected a controller memory. The disk drive is responsive to communication from a host computer. The controller memory includes a set of computer program instructions and data to write data to the disk drive memory as a linear sequence of data bytes in response to a write data command from the computer. In yet other embodiments, the invention uses hardware data compression to compress data before it is written to a disk drive, and to decompress data before compressed data is returned to a computer.

7 Claims, 5 Drawing Sheets

SYSTEM, APPARATUS, AND METHOD FOR USING A DISK DRIVE FOR SEQUENTIAL DATA ACCESS

FIELD OF THE INVENTION

The present invention relates to data compression. In particular, the present invention relates to a system, structure and procedure for using a direct access storage device for sequential data access with optional embedded hardware data compression.

BACKGROUND OF THE INVENTION

Random access data storage devices (random access devices) are sometimes used to archive data in a compressed format using software data compression techniques. Random access devices include, for example, hard disk drives, disk drives with removable storage medium, (removable cartridges), magneto optical drives, near field optical storage disks, and diskettes. Use of hardware data compression techniques to archive data offer a number of benefits as compared to use of software data compression techniques. For example, hardware data compression techniques typically operate faster than software compression techniques. Additionally, hardware data compression is transparent, meaning that it operates without any outside intervention, by for example, another software program or an end user. In contrast, software data compression (often implemented as file compression utilities) does not operate transparently, but rather requires explicit software program or end user intervention to compress and decompress data.

Because data storage systems typically include a number of random access devices, and because of the inexpensive nature of random access devices, it would be beneficial to implement hardware data compression techniques on random access devices. Such a known data storage system, for example, is a Redundant Array of Inexpensive Disks, or a RAID. Unfortunately, because of the nature of data access in random access devices, hardware data compression cannot be used to compress and decompress data on random access devices. Therefore, random access devices are not able to realize the benefits of hardware data compression.

To understand why this is the case, a brief discussion of the nature of data access on a random access device is presented. Random access devices are direct access devices, meaning that data can be read from and written to any location, or address on a random access device. To read data from, or write data to a random access device, two items of information must be supplied through the use of a programmatic interface, a begin address and a data transfer length. (Such programmatic interfaces are known, for example, SCSI read and write commands).

The begin address specifies a particular address on the physical medium of the storage device of where to begin reading or writing data. The data transfer length indicates the number of bits of data that are to be read from, or written to the device. Because a random access device allows direct read and write access to any location on its physical medium, and because the size of compressed data can vary depending on the amount of redundancy in the data, use of hardware compression on a random access device presents a significant problem, where data that was previously written on the device can be erroneously overwritten and corrupted.

For example, a random access data storage device driver, or driver receives a command to write 100 blocks of data A to a direct access device starting at location X. The data is compressed using hardware compression, and compresses to a length of 70 blocks. These 70 blocks of compressed data are then written by the driver to the device at location X. The driver receives another command to write some number of blocks of data B to the device starting at location A+100. This data is then compressed to some length, and written by the driver to the device at location A+70 (recall that data A was compressed from 100 blocks to 70 blocks). The driver receives yet another command to write 100 blocks of data to the device starting at location A. This data is then compressed. However, in this instance, the data only compresses to the size of 80 blocks. In this instance, because the recompressed 80 blocks of data will not fit into location A (location A includes 70 blocks of storage space), when the driver writes the recompressed data to location A, 10 blocks of data B (previously stored at location A+70) will be erroneously overwritten and corrupted.

Sequential access data storage devices (sequential access devices), for example SCSI tape drives, are also used to archive data in a compressed format. Sequential access devices typically use embedded hardware data compression to compress data before it is stored onto the device's physical medium. In contrast to how data is written and read from a random access device, data stored on a sequential access device is organized as a linear sequence of data blocks, wherein a set of data blocks are respectively read or written in a sequential manner.

Sequential access devices allow data to be written onto the physical medium only at two locations, the beginning of the recording medium and at the end of a last, previously written data block on the recording medium. If data is written to the beginning of the medium, any data that was previously written to the medium will become unavailable. Otherwise, data is always written to the medium at a location that immediately follows the last block of data that was previously written to the medium. Using these procedures, the location on the medium where data is to be written will always empty, and writing data to the medium will not corrupt any previously written data. Therefore, hardware compression can be used to increase storage space on sequential access devices, because the after compression data does not need to fit into a predetermined number of bits on the device's physical storage medium.

Because random access devices allow direct read and write access to data locations on its physical medium, hardware data compression on the random access device. What is needed is an apparatus and procedure for using hardware compression on a random access device, such that the benefits of hardware data compression can be realized in the random access device.

SUMMARY OF THE INVENTION

In one embodiment, a method of the invention is performed on a disk drive that includes a controller that is connected to a physical media. The controller includes a processor that is connected a controller memory. The disk drive is responsive to communication from an external computer. In response to communication from the computer, the processor respectively performs I/O to/from the physical media using sequential data access techniques.

In yet another embodiment, the invention is a system that includes, a disk drive, and a host computer connected to the disk drive. The disk drive is responsive to communication from the computer. The disk drive includes a disk drive memory and a controller coupled to the disk drive memory.

The controller includes a processor a controller memory connected to the processor. The controller memory includes a set of computer program instructions and data to write data to the disk drive memory as a linear sequence of data bytes in response to a write data command from the computer.

The invention include other embodiments, for example, a disk drive and a computer program product for performing sequential data access in response to commands from a computer. In yet other embodiments, the system, apparatus, method and computer program product use hardware data compression to compress data before it is written to a disk drive, and to decompress data before compressed data is returned to a computer.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF EMBODIMENTS OF THE INVENTION

For purposes of this description, the word phrase "disk drive" is used to denote what is typically referred to as a random access data storage device. This word phrase is appropriate for a number of reasons. First the word phrase is appropriate because random access disk drives store data on one or more rotating platters, or disks. Second, even though tradition disk drives are accessed using random data access techniques, the word phrase is appropriate because one embodiment of the present invention operates in sequential data access mode.

Figure 1:
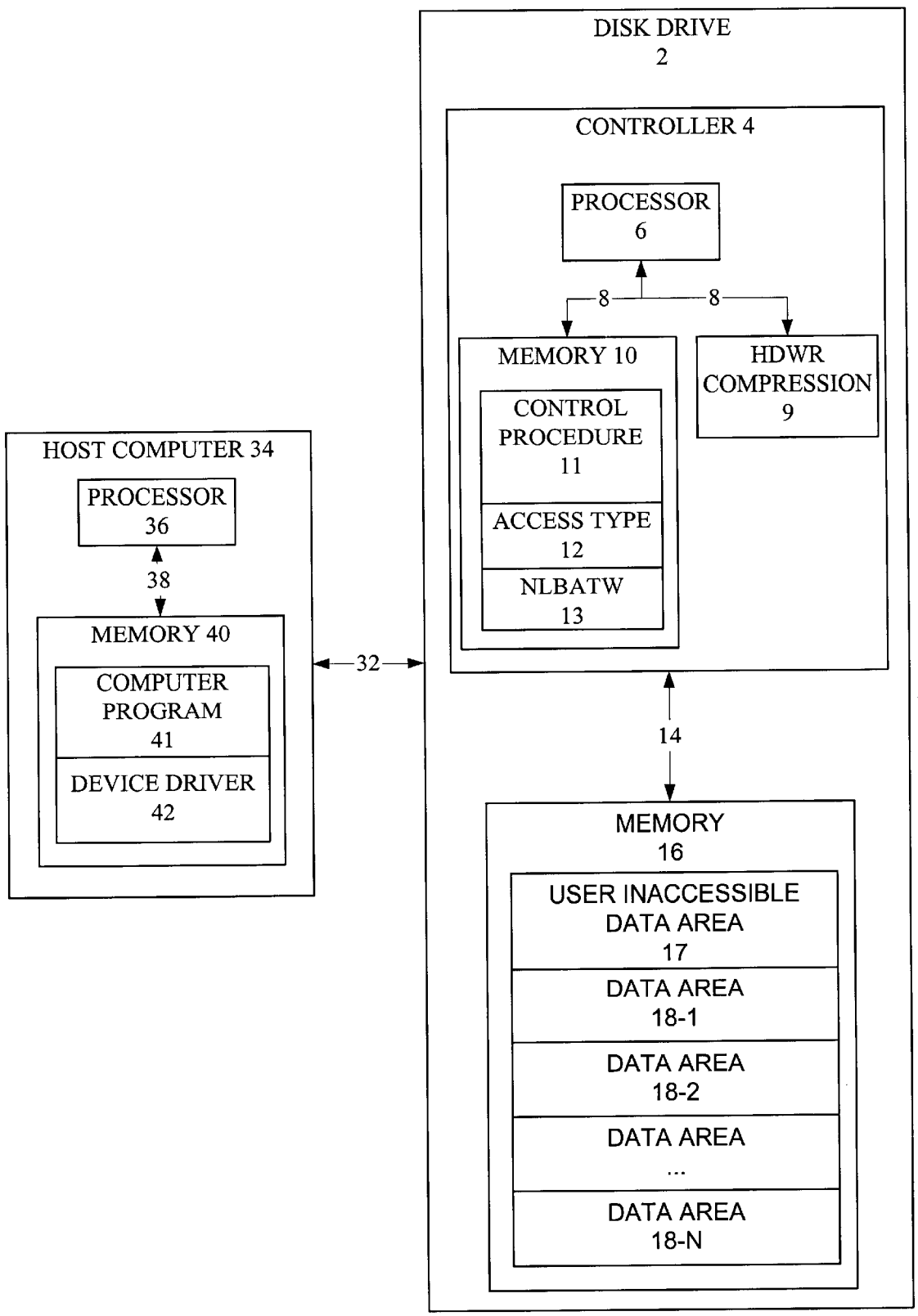
FIG. 1 is block diagram that illustrates aspects of an exemplary system providing sequential data access to a disk drive, according to one embodiment of the present invention.

Referring to FIG. 1, there is shown a block diagram that illustrates aspects of an exemplary system, according to one embodiment of the present invention. Disk drive 2 is connected over bus 32 to host computer 34. Bus 32 can be any type of bus, for example a Small Computer System Interface (SCSI) bus, as long as the bus 32 has a set of signal lines that can be used by host computer 34 to transfer information respectfully to and from disk drive 2. Peripheral host computer 34 includes, for example, processor 36, which in turn is connected to first local bus 38. First local bus 38 can be any type of bus, for example a peripheral component interconnect (PCI) bus, as long as the local bus 38 has a set of signal lines that can be used by processor 36 to transfer information respectfully to and from memory 40.

Memory 40 includes any combination of storage that is internal or external to processor 36 that is addressable by processor 36. For example, memory 40 can be cache memory, random access memory (RAM), non-volatile flash RAM, or external virtual memory on a data storage device, for example, disk drive 2, where virtual addresses are mapped by processor 36 into real addresses. Processor 36 fetches and executes computer program instructions in memory 40 to operate disk drive 2 for either sequential or direct data access. Such computer program instructions include, for example, computer program 41 and device driver 42.

In one embodiment, device driver 42 provides a high level application programming interface (API) to computer program 41, such that device driver 42 will serve as an interface to control input/output (I/O) between computer program 41 and disk drive 2. For example, when computer program 41 sends a format command, for example format command 56 or format command 60 (see FIGS. 3–4), to disk drive 2, device driver 42 will control the communication of the format command to disk drive 2. Procedures for creating device drivers are known in the art of computer programming. Procedures used to format disk drive 2 are discussed in greater detail below in reference to FIG. 3.

Disk drive 2 includes controller 4, which in turn includes processor 6. Processor 6 is connected across second local bus 8 to memory 10 and hardware (HDWR) compression unit 9. Second local bus 8 can be any type of bus, for example, a Peripheral Interconnect Interface (PCI) bus, as long as bus 8 has a set of signal lines that can be used by processor 6 to transfer information respectively to and from memory 10. Memory 10 includes any combination of memory that is internal or external to processor 6 that is addressable by processor 6. For example, memory 10 can cache memory, random access memory (RAM), non-volatile flash RAM, or external virtual memory on a data storage device. For example, memory 10 can include user inaccessible regions of memory 16, where virtual addresses are mapped by processor 6 into real addresses. In one embodiment, hardware compression unit 9 is used by controller 4 to compress and decompress data as it is respectively written to and read from memory 16.

Processor 6 fetches and executes computer program instructions and data from memory 10. Such computer program instructions include, for example control procedure 11, which performs a number of functions, for example, controlling input/output (I/O) between disk drive 2 and peripheral 23, and for formatting the physical media (wherein is located memory 16) of disk drive 2. (Procedures to format disk drive's 2 physical media are described in greater detail below in reference to FIG. 3). Control procedure 11 uses data type 12 to indicate to peripheral host computer 34 that disk drive's 2 physical media can be formatted either for sequential data access and/or for direct data access. (Only after disk drive's 2 physical media has been formatted can disk drive 2 be used to archive data). This is a significant advance over the prior art, where disk drives are unable to be formatted for sequential data access. In a preferred embodiment, data access 12 is stored in nonvolatile flash RAM in memory 10.

Control procedure 11, in response to a write data request from peripheral host computer 34, uses next logical block address to write (NLBATW) 13 to indicate where to begin writing the data included in the write data request. An inventive procedure to write data to memory 16 is described in greater detail below in reference to FIG. 6.

Memory 16 is connected to controller 4 across a set of read/write channels 14. Such read/write channels 14 are known in the art of manufacturing data storage devices. Memory 16 is the physical media of disk drive 2, which includes one or more platters, or disks. Memory 16 stores data. When memory 16 is formatted for direct data access, data from peripheral host computer 34 is stored in memory 16 according to traditional direct data access techniques, which are known in the art of computer programming. For this reason, the following detailed description describes the data architecture of memory 16 with respect to the case when memory 16 is formatted for sequential data access.

In contrast to how data is stored when memory 16 is formatted for direct data access, when memory 16 is formatted for sequential data access, data is stored in sequential data areas, for example, data area 18-1, data area 18-2, and data area 18-N. There can be any number of data areas 18-X, depending upon the number of times that data is archived by peripheral host computer 34 to memory 16. In particular, each time data is archived to disk drive 2, control procedure 11 (see controller 4) creates one such data area 18-X.

Figure 2:
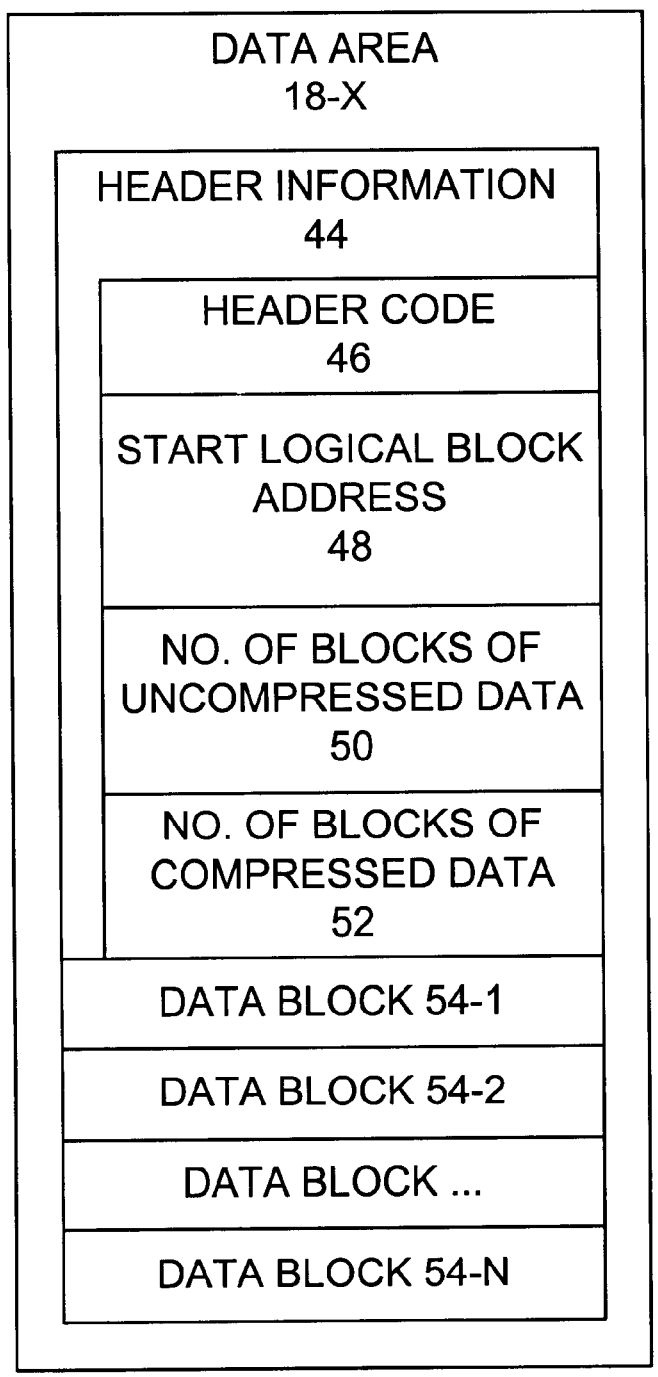
FIG. 2 is block diagram that illustrates aspects of an exemplary architecture of a data area in a memory, according to one embodiment of the present invention.

FIG. 2 is a block diagram that illustrates aspects of an exemplary data area 18-X, according to one embodiment of the present invention where disk drive 2 is formatted for sequential data access. In response to receiving a write data command from peripheral host computer 34, control procedure 11 will create a corresponding header information 44. Optional header code 22 indicates that this is header information 44, and not data that was written to disk drive 2 by peripheral host computer 34. Start logical block address 48 indicates a logical block address in memory 16 (see FIG. 1), wherein processor 6 will store a set of data that is included in a corresponding write data command from peripheral host computer 34, for example, a SCSI write data command.

Number of blocks of uncompressed data 50 is used by control code 11 to determine where a next header information 44 is when uncompressed data is stored to disk drive 2. Number of blocks of compressed data 50 is used by control code 11 to determine where a next header information 44 is when controller 4 stores compressed data to disk drive 2. Procedures for performing write and a read data requests are described in greater detail below in reference to FIGS. 5–6.

One or more data blocks 54-X are used by control code 11 to archive data written to disk drive 2 in a compressed data format. A data block 54-X is typically 512 bytes in size. However, depending on the hardware and software implementation of disk drive 2, the size of a data block 54-X can be any number of bytes, for example, a data block can be 1024 bytes. In response to a write data request from peripheral host computer 34, header information 44 will be created by control code 11 with at least one data block 54-X, for example, data block 54-1. The number of data blocks 54-X actually used depends both on the transfer length of the data and the byte size of a data block 54-X. If controller uses optional hardware compression unit 9 to compress data before it is stored onto disk drive 2, the number of data blocks 54-X actually used depends on the transfer length of the data, the byte size of a data block 54-X, and on the size of data after it has been compressed.

Figure 3:
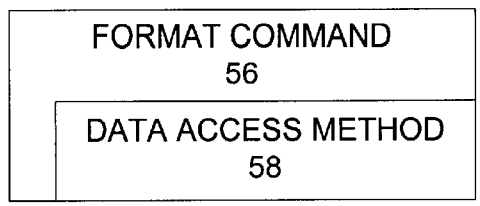
FIG. 3 is block diagram that illustrates aspects of an exemplary format command, according to one embodiment of the present invention.
Figure 4:
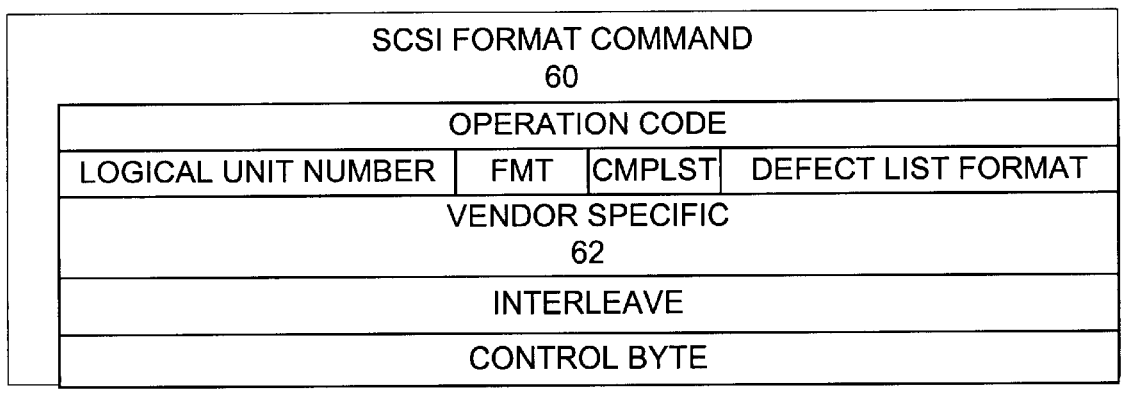
FIG. 4 is block diagram that illustrates aspects of an yet another exemplary format command, according to one embodiment of the present invention.

Referring to FIG. 3, there is shown a block diagram that illustrates aspects of an exemplary format command 56, according to one embodiment of the present invention. To format the physical media of disk drive 2, peripheral device sends disk drive 2 format command 56 with data access method 58 set to a value that indicates that the physical media is to be formatted for either sequential data access or for direct data access. Procedures for formatting disk drive 2 are described in greater detail below in reference to FIG. 5.

In yet another embodiment of the present invention, the format command used to format disk drive 2 can be any type of standard format command that has a vendor specific data field, wherein a data access method 58 can be specified. For example, referring to FIG. 4, there is shown a block diagram of standard SCSI format command 60 that includes vendor specific field 62. In one embodiment, vendor specific field 62 is used by computer program 41 to indicate one of the above described values of data access method 58. Although SCSI format command 60 is known in the art of computer programming, an inventive aspect of the present invention is the use of vendor specific field 62 to indicate that disk drive 2 (see FIG. 1) is to be formatted for either sequential data access or direct data access.

Figure 5:
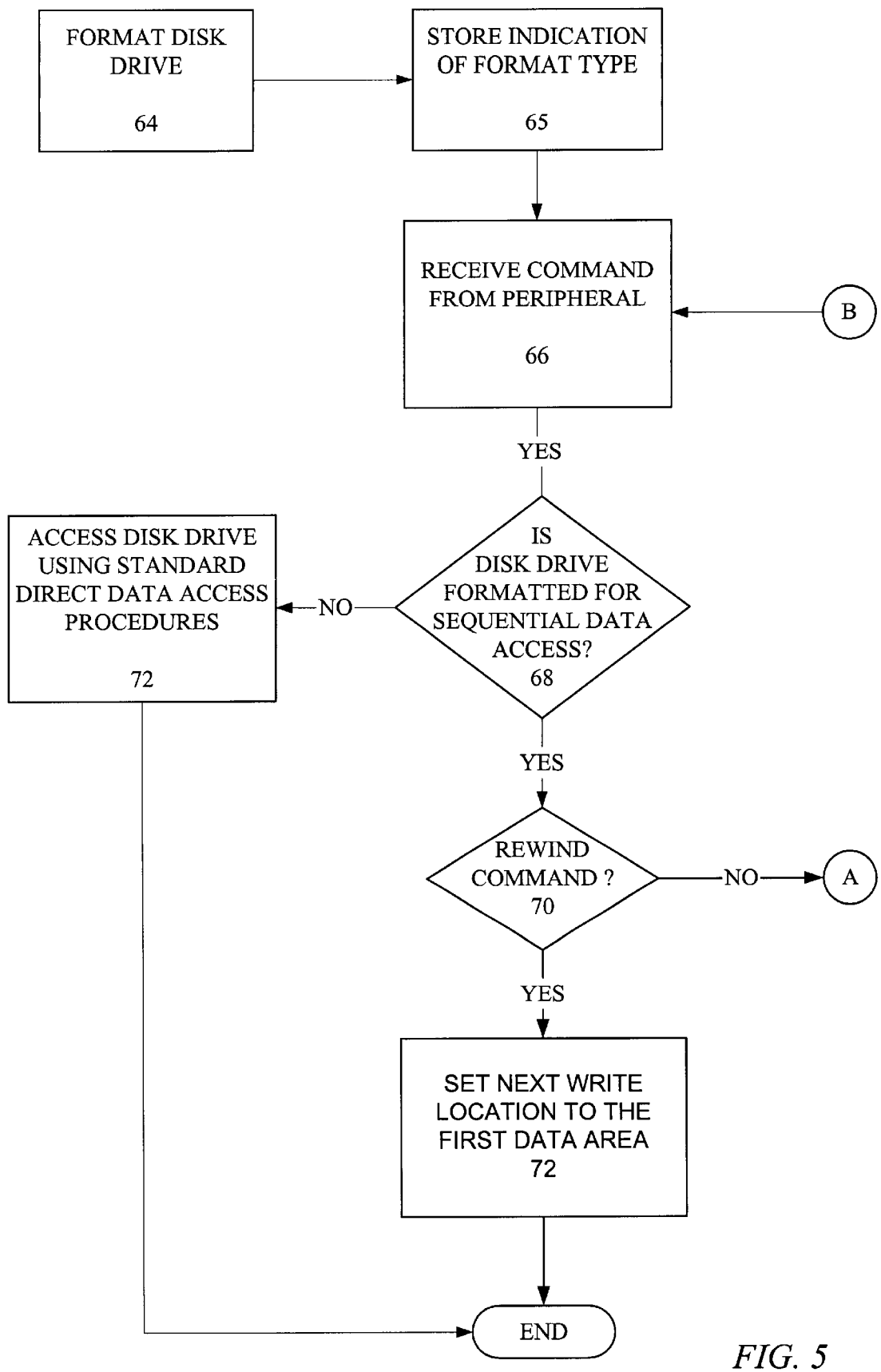
FIG. 5 is a flow diagram that illustrates aspects of an exemplary procedure to a disk drive that supports either sequential data access or direct data access, according to one embodiment of the present invention; and, FIG. 6 is a flow diagram that illustrates aspects of an exemplary procedure to a disk drive that supports either sequential data access or direct data access, according to one embodiment of the present invention.

Referring to FIG. 5, there are illustrated aspects of an exemplary procedure to access disk drive 2 (see FIG. 1) for either sequential data access or direct data access. Because disk drive 2 cannot be used for I/O by peripheral host computer 34 until it has been formatted, step 64 formats disk drive 2 for either sequential data access or direct data access. To accomplish this, peripheral host computer 34 sends format command 56 (see FIG. 3) to disk drive 2 with data access method 58 set to a value that indicates whether disk drive 2 is to be formatted for sequential data access or direct data access. In another embodiment, peripheral host computer 34 sends any one of a number of known format commands as described in greater detail above (see FIG. 4), with vendor specific 62 field set to a value that indicates whether disk drive 2 is to be formatted for sequential data access or direct data access.

In response to receiving a format command 56 of a format command 60, step 65 first stores, by controller 11 (see FIG. 1) into a memory, for example, memory 10 or memory 16, an indication of the format type that was used to format disk drive 2 (step 64). In a first embodiment, the indication is stored in a user inaccessible portion of memory 16, for example, in user inaccessible data area 17. This embodiment is particularly useful for removable cartridge disk drives, where disk drive's 2 physical medium, or memory 16 may be swapped with a different physical medium, each of which may have been formatted for different data access methodologies. In a second embodiment, the indication is stored in a user inaccessible portion of memory 10, for example, in access type 12. Either the first or the second embodiments are compatible when disk drive 2 has a fixed physical media.

Next, in response to receiving a format command, for example, either format command 56 or format command 60, control procedure 11 performs the format. If the format command indicates that disk drive 2 is to be formatted for sequential data access, control code 11 (see FIG. 1) will format the physical media of disk drive 2, such that any data that is subsequently written to disk drive 2 will be organized as a linear sequence of data blocks 54-X (see FIG. 2) according to a set of inventive procedures which are discussed in greater detail below. Whereas, if the format command indicates that disk drive 2 is to be formatted for direct data access, control code 11 (see FIG. 1) will format the physical media of disk drive 2, such that any data that is subsequently written to disk drive 2 will be organized one the physical media in a non-sequential manner according to procedures which are known in the art of computer programming.

Disk drive 2 is now ready to accept programmatic commands from peripheral host computer 34. Such programmatic commands are known in the art of computer programming, for example, the SCSI read data and write data commands. Such programmatic commands are divided into two classes, sequential data access commands, used to communicate with disk drive 2 when it is formatted for sequential data access, and direct data access commands, used to communicate with disk drive 2 when it is formatted for direct data access. The particular class of commands used by peripheral host computer 34 to communicate with disk drive 2 match the formatting of disk drive 2. For example, if disk drive 2 is formatted for sequential data access, then sequential data access commands are used, and vice versa.

Step 66 receives, by disk drive 2, a programmatic command. Step 68 determines if the disk drive is formatted for sequential data access. If not, step 72 executes the command using known direct data access procedures, which were discussed in greater detail above. If disk drive 2 is formatted for sequential data access, step 70 determines if the command is a rewind command. Rewind commands are known in the art, for example, a SCSI rewind command. At step 72, receipt of a rewind command (step 70) causes control procedure 11 to set next logical block address to write (NLBATW) 13 (see FIG. 1) to indicate logical block zero (0) that points to the start of a first data area on the physical media, for example, data area 18-1. As a result, any data which is subsequently written to disk drive 2 will be written in a sequential manner from NLBATW 13, and any data that may have already been stored by peripheral host computer 34 onto disk drive 2 prior to the receipt of the rewind command, will no longer be accessible by peripheral host computer 34. Use of NLBATW 13 is discussed in greater detail below.

Figure 6:
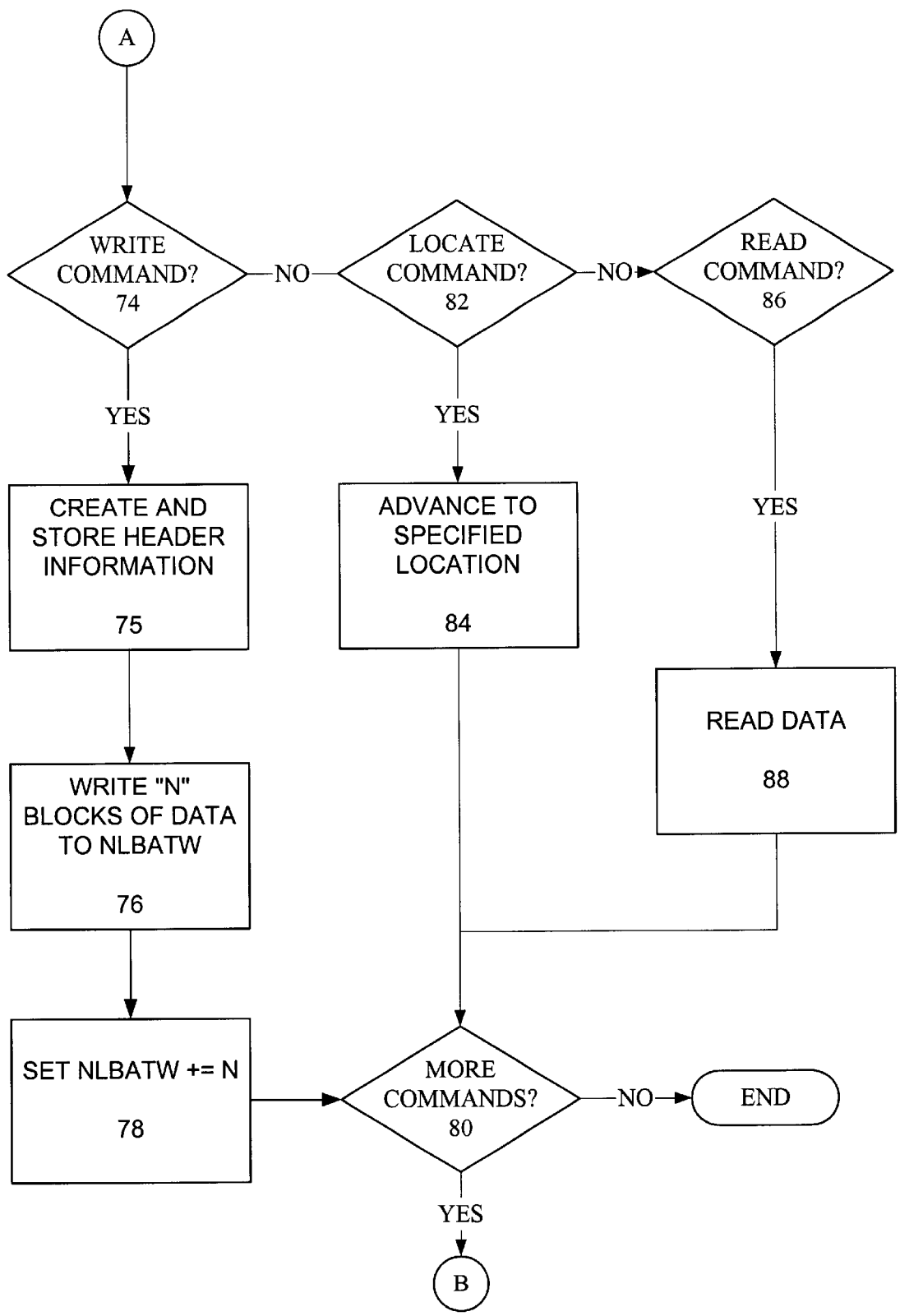

Referring to FIG. 6, step 74 determines if the received command (step 66) is a write data command, for example, a SCSI write command. If so, step 75 causes control procedure 11 to perform two tasks, first create header information 44 (see FIG. 2), and second, store header information 44 into memory 16. To create header information 44, control procedure 11 sets a number of data fields in header information 44 to certain values. Aspects of exemplary contents of header information are discussed in greater detail above in reference to FIG. 2.

For example, In one embodiment, optional header code 46 is set to a value that indicates that header information 44 is a header. Start logical block address 48 is set to a value that indicates the logical block address of where control procedure 11 (see FIG. 1) will write a set of data that corresponds to the write data command. In a preferred embodiment, start logical bloc address is set to equal a location in memory 16 that is immediately after the last memory 16 address wherein header information 44 (see FIG. 2) is stored. Number of blocks of uncompressed data 50 is set to a value that represents the actual number of bytes of data used to store the data associated with the write data request.

Blocks of uncompressed data 50 is used by control procedure 11 to perform one or both of two tasks. In a first task, this value is used to locate a particular block of data that contains the logical block address of data requested by host computer 34. A locate command which causes control procedure 11 to perform this first task is described in greater detail below in reference to FIG. 6, step 82. In a second task, this value is used to allocate a corresponding amount of internal buffer space from memory 10 to which corresponding data will be stored before it is sent to host computer 34 (see FIG. 1). A read command which causes control procedure 11 to perform this second task is described in greater detail below in reference to FIG. 6, step 88.

In one embodiment, where control procedure 11 uses hardware compression unit 9 to compress the data before it is stored into memory 16, control procedure 11 sets number of blocks of compressed data 50 to a value that indicates the actual number of bytes of compressed data that will be written to a data block 54. As discussed above, the value of number of blocks of compressed data 52 depends on the transfer length of the data, the byte size of a data block 54-X, and on the size of data after it has been compressed. In one embodiment, control procedure 11 uses number of blocks of compressed data 50 to determine where a next header information 44 should be written or located.

To store header information 44, control procedure first reads the address that is indicated by NLBATW 13. When disk rive 2 is first formatted, or when disk drive 2 receives a rewind command (discussed below), control procedure 11 sets NLBATW 13 to logical block zero (0). A procedure for setting NLBATW 13 to a different value, other that a value that references logical block zero is discussed in greater detail below in reference to step 78. Control procedure stores header information 44 at the address indicated by NLBATW 13.

Step 76 writes the data that corresponds to the write data request (step 74) to memory 16 as a linear sequence of bytes of data. To accomplish this, control procedure 11 stores the data to a location indicated by the value of start logical block address 48 plus (+) the length in bytes of header information 44. As was discussed in greater detail above in reference to FIG. 1, the number of data blocks 54-X actually used to store the data depends on the transfer length of the data, and the byte size of data block 54-X, and if hardware data compression is used, the compressed size of the data.

Step 78 sets, by control procedure 11, NLBATW 13 (see FIG. 1) to the value of NLBATW plus (+) the byte size of header information 44 (see FIG. 2) plus the number of blocks used to store the data. If hardware data compression unit 9 is used to compress the data before it is stored into memory 16, the number of blocks used to store the data is equal to the compressed block size of the data. Otherwise, the number of blocks used to store the data is equal to the uncompressed block size of the data. Step 80 determines if there are any more commands from peripheral host computer 34 to process, and if so, the procedure continues as described in greater detail above at step 66.

It can be appreciated that using steps 64–78 of this procedure, that any subsequent write data requests from peripheral host computer 34 will cause control procedure 11 to write the data to a location in memory 16 immediately follows the last block of data written to memory 16, for example, data block 54-N, as a linear sequence of bytes. The prior art does not organize data in such a manner disk storage devices that are capable of being formatted for direct data access. Therefore, the system, apparatus and procedure of the present invention offers a significant benefit over the prior art, because disk drive 2 can be used as a sequential data access device, wherein the location in memory 16 will always be empty on disk drive 2 whenever data is written by peripheral host computer 34 to disk drive 2.

This benefit becomes especially significant when optional hardware data compression is used to compress data before it is stored onto disk drive 2. This means that a location in memory 16 that is to be written to will always be empty, and a write data request to a particular logical block will never overwrite, or corrupt any previous data that may have been written to disk drive 2. Therefore, compressed data does not need to fit into a predetermined number of bits in memory 16, and in contrast to the prior art, hardware data compression techniques can be used by the system, apparatus and procedure of the present invention.

Referring to FIG. 6, we now discuss novel procedures to read data from disk drive 2 when disk drive 2 is formatted for sequential data access. Step 82 determines if the received command (step 66) is a locate command. If so, step 84 advances disk drive's 2 read head to particular location in memory 16. The particular location is specified in the locate command. This enables disk drive 2 to read data in response to the receipt of a subsequent read data command from peripheral host computer 34, from the particular location. Next, the procedure continues at step 80, which was described in greater detail above.

Step 86 determines if the command is a read command. As discussed above, such read commands are known in the art and contain a particular logical block address to read from and a transfer length in bytes. Receipt of a read command causes control procedure 11 (see FIG. 1), at step 88, to read the specified transfer length of bytes from memory 16. To accomplish this, first control procedure 11 locates a particular header information 44 wherein start logical block address 48 is equal to the particular logical block address included in the read data command. To accomplish this, control procedure 11 uses the particular header information's 44 corresponding number of uncompressed blocks of data to advance to a next header information, if necessary. Optional header code 46, if implemented, can be used to determine if control procedure has identified a next header information 44. Finally, control procedure 11 reads transfer length number of bytes of data from memory 16 and returns this information to peripheral host computer 34.

In one embodiment, where controller 4 includes embedded hardware compressor 9 to compress data before it is stored into memory 16, receipt of a read command (step 66) by disk drive 2 causes control procedure 6 to perform the following steps to read data from memory 16 (step 68). First, control procedure 11 locates a particular header information 44 wherein start logical block address 48 is equal to the particular logical block address included in the read data command.

To accomplish this, control procedure 11 uses the particular header information's 44 corresponding number of compressed blocks of data to advance to a next header information, if necessary. The actual number of data blocks 54-X used to store the compressed data depends on the number of bytes of data that were written onto disk drive 2 (step 76) and on the compression ratio of the uncompressed data Optional header code 46, if implemented, can be used to determine if control procedure has identified a next header information 44. Finally, hardware (HDWR) compression unit 9 decompresses a section of data into memory 10, for example RAM memory. The specified transfer number of bytes of information are then transferred to peripheral host computer 34.

The foregoing descriptions of specific embodiments of the present invention have been presented for purposed of illustration and description. They are not intended to be exhaustive or to limit the invention to the precise forms disclosed, and obviously many modifications and variations are possible in light of the above teaching. For example, the model of disk drive 2 (see FIG. 1) does not specify that data must be stored in a nonvolatile manner. This allows for disk drive 2 to also be implemented out of random access memory (RAM—hence RAM disk). If disk drive 2 is implemented from RAM, disk drive 2 will provide very fast sequential data access or direct data access storage that loses information when the power is removed.

In yet another example, the apparatus and procedures of disk drive 2 and host computer 34 (see FIG. 1) may be implemented in an environment wherein disk drive 2 is connected to one or more peripherals which are in turn connected to host computer 34. For example, in one embodiment, disk drive 2 is connected to a networking switch, such as a network router, that is in turn connected to host computer 34. In yet another embodiment, disk drive 2 is in a Redundant Array of Independent Disks (RAID), wherein disk drive 2 is connected to a disk array controller, for example, a RAID controller, which is in turn connected to one or more host computers 34.

The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

What is claimed is:

1. A method for accessing data on disk storage within a disk drive, said disk drive also including a controller, said method comprising the steps of:

installing a first, removable disk storage in the disk drive, said first disk storage being capable of random access if formatted for random access and being capable of sequential access if formatted for sequential access, said first disk storage storing a first indication that said first disk storage has been formatted for random access;

the storage controller reading said first indication in said first disk storage to learn that said first disk storage has been formatted for random access and subsequently randomly accessing said first disk storage;

removing said first disk storage and installing in its place a second, removable disk storage, said second disk storage being capable of random access if formatted for random access and being capable of sequential access if formatted for sequential access, said second disk storage storing a second indication that said second disk storage has been formatted for sequential access;

said storage controller reading said second indication in said second disk storage to learn that said second disk storage has been formatted for sequential access and subsequently sequentially accessing said second disk storage.

2. A method as set forth in claim 1 further comprising the step of said storage controller formatting said second disk storage for sequential access before the step of storing said second indication.

3. A method as set forth in claim 2 further comprising the step of said storage controller formatting said first disk storage for random access before the step of storing said first indication.

4. A method as set forth in claim 1 further comprising the steps of compressing data and then writing said compressed data to said second disk storage in sequential access mode.

5. A method as set forth in claim 1 wherein the step of sequentially accessing said second disk storage comprises the step of writing data to said second disk storage in sequential access mode.

6. A method as set forth in claim 1 wherein said first indication is stored on a user inaccessible portion of said first disk storage.

7. A method as set forth in claim 1 wherein said second indication is stored on a user inaccessible portion of said second disk storage.

* * * * *